United States Patent
Wassenhoven

(10) Patent No.: US 9,670,602 B2
(45) Date of Patent: Jun. 6, 2017

(54) OPEN-END SPINNING ROTOR

(71) Applicant: Saurer Germany GmbH & Co. KG, Remscheid (DE)

(72) Inventor: Heinz-Georg Wassenhoven, Monchengladbach (DE)

(73) Assignee: Saurer Germany GmbH & Co. KG, Remscheid (DE)

( * ) Notice: Subject to any disclaimer, the term of this patent is extended or adjusted under 35 U.S.C. 154(b) by 293 days.

(21) Appl. No.: 14/620,556

(22) Filed: Feb. 12, 2015

(65) Prior Publication Data

US 2015/0233025 A1   Aug. 20, 2015

(30) Foreign Application Priority Data

Feb. 15, 2014   (DE) .................. 10 2014 002 102

(51) Int. Cl.
   *D01H 4/10*   (2006.01)
(52) U.S. Cl.
   CPC ...................................... *D01H 4/10* (2013.01)
(58) Field of Classification Search
   CPC .................................. D01H 4/10; D01H 4/12
   See application file for complete search history.

(56) References Cited

U.S. PATENT DOCUMENTS 2,561,745 A    7/1951 Lerch
3,074,227 A *  1/1963 Fujiyoshi ................. D01H 7/16
                                                192/38
3,815,836 A *  6/1974 Munnekehoff ...... B65H 54/543
                                                242/571.7
4,334,652 A *  6/1982 Blackburn ........... B65H 75/246
                                                242/571.5

(Continued)

FOREIGN PATENT DOCUMENTS

DE    289888 C    1/1916
DE    421342 C    11/1925

(Continued)

OTHER PUBLICATIONS

Search report of European Patent Office dated Jun. 15, 2015, in Application No. 15000311.9.

(Continued)

*Primary Examiner* — Shaun R Hurley
(74) *Attorney, Agent, or Firm* — Nelson Mullins Riley & Scarborough LLP

(57) ABSTRACT

An open-end spinning rotor (1), comprising a rotor shaft (2), a rotor cup (3) and a coupling device (4) with a receiving element (5) connected to the rotor shaft (2) and an axle element (6) connected to the rotor cup (3). The coupling device (4) comprises three clamping bodies (7, 8, 9), arranged between a contour (10) of the receiving element and a contour (11) of the axle element. The contour of the receiving element, the contour of the axle element and the clamping bodies are configured such that by driving the rotor shaft, a relative rotational movement is produced between the receiving element and the clamping bodies and the axle element, in that owing to the relative rotational movement, the clamping bodies are clamped between the contour of the axle element and the contour of the receiving element to non-positively transmit a drive torque.

7 Claims, 2 Drawing Sheets

(56) References Cited

U.S. PATENT DOCUMENTS

| | | | | |
|---|---|---|---|---|
| 4,496,114 | A * | 1/1985 | Kataoka | B65H 75/247 242/571.7 |
| 4,767,077 | A * | 8/1988 | Kataoka | B65H 75/246 242/571.7 |
| 5,490,640 | A * | 2/1996 | Miller | B65H 75/246 242/571.6 |
| 5,555,715 | A * | 9/1996 | Paweletz | D01H 4/10 310/86 |
| 6,283,404 | B1 * | 9/2001 | Fournier | B65H 75/247 242/530.1 |
| 6,755,371 | B2 * | 6/2004 | Watanabe | B65H 18/10 242/530.3 |
| 6,863,466 | B2 | 3/2005 | Buhren | |
| 8,875,482 | B2 | 11/2014 | Wassenhoven | |
| 2009/0084081 | A1 * | 4/2009 | Wassenhoven | D01H 4/10 57/404 |

FOREIGN PATENT DOCUMENTS

| | | |
|---|---|---|
| DE | 908460 C | 4/1954 |
| DE | 1164292 B | 2/1964 |
| DE | 38 15 182 A1 | 11/1989 |
| DE | 196 18 027 A1 | 11/1997 |
| DE | 103 26 849 A1 | 12/2004 |
| DE | 10 2009 048 295 A1 | 7/2010 |
| DE | 10 2012 008 693 A1 | 10/2013 |
| EP | 1 156 142 B1 | 2/2001 |
| EP | 1156142 B1 | 4/2004 |

OTHER PUBLICATIONS

German Search Report for German Patent Application No. DE 10 2014 002 102.5, dated Jan. 2, 2015.

* cited by examiner

US 9,670,602 B2

OPEN-END SPINNING ROTOR

CROSS REFERENCE TO RELATED APPLICATIONS

This application claims the benefit of German patent application DE 10 2014 002 102.5, filed Feb. 15, 2014, herein incorporated by reference.

FIELD OF THE INVENTION

The present invention relates to an open-end spinning rotor, more particularly an open-end spinning rotor comprising a rotor shaft, a rotor cup and a coupling device, which releasably connects the rotor shaft and the rotor cup and has a receiving element connected to the rotor shaft and an axle element connected to the rotor cup.

BACKGROUND OF THE INVENTION

Spinning rotors used in open-end spinning machines, if necessary, for example in the case of wear or in order to manufacture a different type of yarn on the rotor-spinning machine, have to be able to be changed. Depending on the type of mounting, it may make the change of open-end spinning rotors more difficult or even impossible if the rotor cup and the rotor shaft are non-releasably connected to one another. Therefore, a large number of observations have already been made as to how the connection between the rotor cup and rotor shaft can be made releasable. Apart from the easy exchangeability of the rotor cup, the secure connection during operation of the spinning rotor is also paramount. It is to be noted here that the spinning rotor is operated at rotational speeds of 150,000 revolutions per minute and more. Rotor spinning machines are known that reach up to 200,000 revolutions per minute.

One possibility for a releasable connection of this type is described in European Patent Publication EP 1 156 142 B1. This is realised by means of a coupling device, which consists of a magnetic bearing arrangement for the axial locking of the rotor shaft and rotor cup and a mechanical anti-rotation lock, which prevents any relative rotational movement between the rotor shaft and rotor cup by means of an interlocking fit. A receiving sleeve is let into the rotor shaft by means of a press fit. The receiving sleeve has, one behind the other in the axial direction, a permanent magnet, a polygon socket and a cylindrical bore. The rotor cup has an axle stub or an attachment made of ferromagnetic material with an external polygon, which corresponds with the polygon socket, and a guide attachment, which corresponds with the cylindrical bore.

The cylindrical bore is to surround the guide attachment without play. A play-free connection of this type is not possible, however, because of the manufacturing tolerances always present. In order to ensure the exchangeability of the rotor cup, play between the cylindrical bore and the guide attachment will thus always be necessary. However, even with a small amount of play within the range of a few hundredths of millimeters, imbalance forces may be produced at the high rotational speeds, at which the spinning rotor rotates, which can damage the drive and/or the mounting of the spinning rotor. The imbalance is produced here by the axial offset between the rotor cup and rotor shaft.

SUMMARY OF THE INVENTION

It is therefore an object of the present invention to develop the spinning rotor in such a way that the rotor cup can easily be exchanged and a reliable centering of the rotor cup and rotor shaft is simultaneously achieved.

Briefly summarized, the present invention resides in an open-end spinning rotor which basically comprises a rotor shaft, a rotor cup and a coupling device which releasably connects the rotor shaft and the rotor cup and has a receiving element connected to the rotor shaft and an axle element connected to the rotor cup. The object of the invention is addressed according to the invention by providing the coupling device with three clamping bodies, which are arranged between a contour of the receiving element and a contour of the axle element. According to the invention, the contour of the receiving element, the contour of the axle element and the clamping bodies are configured in such a way that by driving the rotor shaft, a relative rotational movement is firstly produced between the receiving element on the one hand and the clamping bodies and the axle element on the other hand, in that by the relative rotational movement, the clamping bodies are clamped between the contour of the axle element and the contour of the receiving element and in that a non-positive transmission of the drive torque from the rotor shaft to the rotor cup thereby takes place. Advantageous further developments of the invention are described hereinafter.

A reliable centering of the rotor cup takes place owing to the coupling device according to the invention, and easy exchangeability of the rotor cup is simultaneously ensured. In order to achieve this, the centering firstly takes place when the spinning rotor is started up, or expressed differently, by the driving of the rotor shaft. In the rest state of the spinning rotor, in other words, when the rotor shaft is not driven, the axle element of the rotor cup can easily be displaced in relation to the receiving element of the rotor shaft. The contour of the receiving element, the contour of the axle element and the clamping bodies are configured in such a way that there is a position, in which the clamping bodies have adequate play between the contour of the receiving element and the contour of the axle element. The clamping bodies are arranged so as to be movable at least to a limited extent so that the system of the axle element, receiving element and clamping bodies can be centred when the rotor shaft is driven. The mode of action is based here on the inertia of the rotor cup. As the receiving element, the axle element and the clamping bodies are not rigidly connected to one another, the clamping bodies and the axle element remain in their rest state for a brief moment when the rotor shaft is started up. As a result, the relative rotational movement between the receiving element on the one hand and the clamping bodies and the axle element on the other hand is produced. As soon as the clamping bodies are clamped between the contour of the receiving element and the contour of the axle element, the connection is absolutely free of play. The clamping state is thus securely maintained and therefore so is the non-positive transmission of the drive torque from the rotor shaft to the rotor cup as long as the rotor shaft is driven. Once the spinning rotor has been braked and passes back into the rest state, the clamping state is released by itself and the clamping can easily be eliminated by minimal rotation of the rotor cup during the manual change of the rotor cup.

Advantageously, the contour of the receiving element, the contour of the axle element and the clamping bodies are configured in such a way that the clamping bodies are clamped between the contour of the receiving element and the contour of the axle element independently of the drive direction of the rotor shaft when the rotor shaft is driven. It is thus possible for the spinning rotor to be able to be driven in different directions depending on the desired yarn twist.

In principle, the coupling device may have more than three clamping bodies but it is most favourable to use precisely three clamping bodies, however. In the case of precisely three clamping bodies, all the clamping bodies are uniformly clamped in each case.

For a coupling device with precisely three clamping bodies, the contour of the receiving element is preferably triangle-like. In order to remove the rotor cup from the rotor shaft, or to connect the rotor cup to the rotor shaft, the clamping bodies are arranged in the corners of the triangle-like contour. Sufficient play is thus present between the contour of the receiving element, the contour of the axle element and the clamping bodies in order to ensure easy exchangeability of the rotor cup. By driving the rotor shaft, the clamping bodies are positioned in the region of the sides of the triangle-like contour and thus clamped.

The contour of the axle element is preferably circular. In other words, the axle element is cylindrical and therefore rotationally symmetrical. The clamping bodies are preferably configured as rolling bodies. It is sufficient if only the contour of the axle element has a non-rotationally symmetrical shape, for example an n-fold radially symmetrical shape. In the case of an equilateral triangle, this is a three-fold radially symmetrical shape.

According to a preferred embodiment of the coupling device according to the invention, a cage, which is configured to hold the clamping bodies in the receiving element when the rotor cup is released from the coupling device, is associated with the receiving element. The cage is designed here in such a way that it does not restrict the mobility of the clamping bodies in the rotational direction.

The coupling device can additionally have locking means for axially locking the rotor cup. An additional axial locking ensures that the rotor cup also adopts a defined position before the driving of the rotor shaft and the fixing connected therewith of the axle element, receiving element and clamping bodies.

BRIEF DESCRIPTION OF THE DRAWINGS

The invention will be described in more detail below with the aid of an embodiment shown in the drawings, in which.

DETAILED DESCRIPTION OF THE INVENTION

Figure 1:
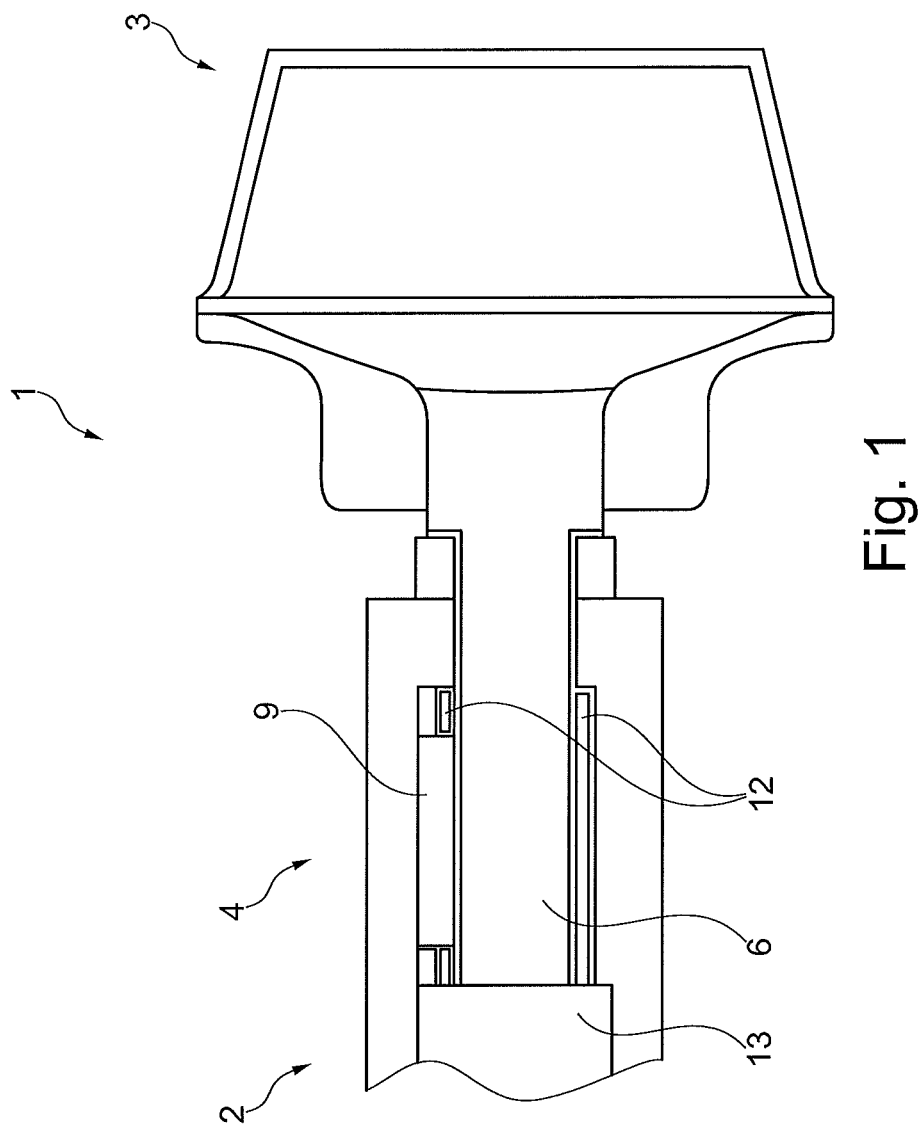
FIG. 1 shows an open-end spinning rotor according to the invention with a coupling device for the releasable connection of the rotor shaft and rotor cup in a side view.

FIG. 1 shows an open-end spinning rotor 1 according to the invention. The open-end spinning rotor 1 has a rotor shaft 2. The rotor shaft 2 is driven by a drive device, not shown, preferably a single drive. The rotor cup 3 is releasably connected to the rotor shaft 2 by means of a coupling device 4. The rotor cup 3 can thus be exchanged in the case of wear or to spin a different type of yarn.

Figure 2:
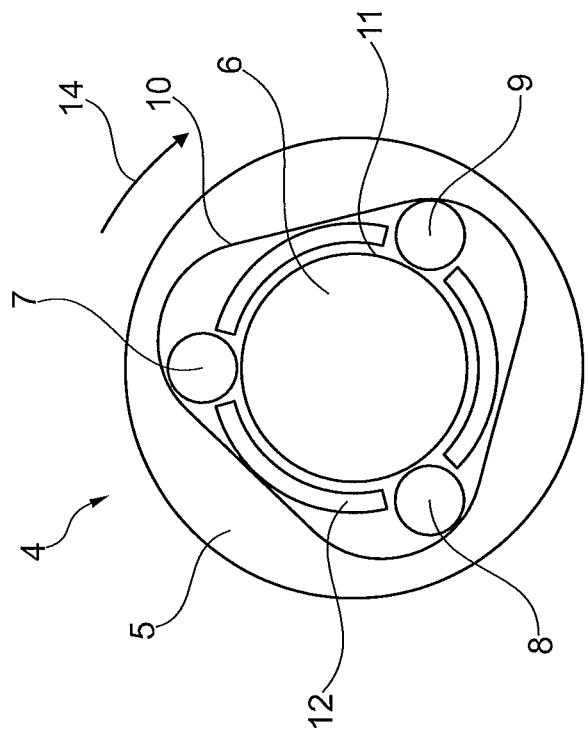
FIG. 2 shows a sectional view through the coupling device of an open-end spinning rotor according to the invention.

In the sectional view in FIG. 2, the coupling device 4 is shown in more detail. The coupling device 4 has a receiving element 5, an axle element 6 and three clamping bodies 7, 8, 9 configured as rolling bodies. In this case, the receiving element 5 is rigidly connected to the rotor shaft 2. The rotor shaft 2 and receiving element 5 may be configured in one piece here as one component or the receiving element 5 can be connected as an insert by a press fit to the rotor shaft 2. Accordingly, the axle element 6 is rigidly connected to the rotor cup 3. The clamping bodies 7, 8, 9 are arranged in the receiving element 5 and are held by a cage 12. As can be seen in FIG. 1, the cage 12 with the clamping bodies 7, 8, 9 is arranged in a peripheral groove of the receiving element 5. As a result, an axial fixing of the cage 12 with the clamping bodies 7, 8, 9 in the receiving element 5 is achieved. At the same time, a mobility in the rotational direction is maintained. The cage 12 ensures, even with the removed axle element 6, that the clamping bodies 7, 8, 9 are held in the receiving element 5. The receiving element 5 has a triangle-like contour 10. As can be inferred from FIG. 2, triangle-like does not necessarily mean triangular in a narrow geometric sense. The corners of the triangle-like contour 10 are rounded. The triangle-like contour 10 has a three-fold radial symmetry. In other words, upon a rotation of the contour 10 through an angle of 120°, the contour is mapped on itself. Formulated in general, an n-fold radial symmetry is present when the arrangement can be mapped on itself by a rotation through 360°/n. In a configuration of the coupling device, not shown, with n clamping bodies, the contour of the receiving element preferably has an n-fold radial symmetry of this type.

In the embodiment as shown in FIG. 2, the axle element 6 is cylindrical. In other words, the contour 11 of the axle element 6 is circular. The clamping bodies 7, 8, 9 are arranged between the contour 10 of the receiving element 5 and the contour 11 of the axle element 6. FIG. 2 shows the coupling device 4 in the rest state, in other words when the rotor shaft 2 is not driven. The clamping bodies 7, 8, 9 are located in the region of the corners of the triangle-like contour 10. In this position, the axle element 6 of the rotor cup 3 can easily be pulled out of the receiving element 5 of the rotor shaft 2 and can be introduced again correspondingly easily.

Figure 3:
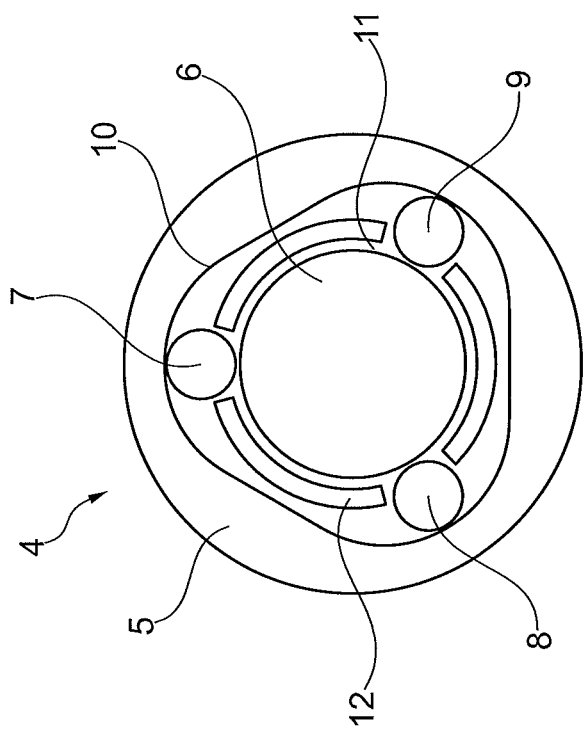
FIG. 3 shows the coupling device according to FIG. 2 with clamped clamping bodies.

FIG. 3 shows the coupling device 4 directly once the drive of the open-end spinning rotor 1 has been started up. The receiving element 5 rotates together with the rotor shaft 2 in the direction of the arrow 14. The clamping bodies 7, 8, 9 and the axle element 5 are not rigidly connected to the rotor shaft 2. Therefore, because of the inertia, they remain in their starting position for a brief moment. Thus, a relative rotational movement is produced between the receiving element 5 on the one hand and the axle element 6 and the clamping bodies 7, 8, 9 on the other hand. Owing to the relative rotational movement, the clamping bodies 7, 8, 9 are brought into the region of the sides of the triangle-like contour 5. In this region, the spacing between the triangle-like contour 10 and the circular contour 11 is smaller than in the region of the corners of the triangle-like contour 10. As a result, the clamping bodies 7, 8, 9 are clamped between the contours 10 and 11 and a torque can be transmitted from the rotor shaft 2 to the rotor cup 3.

In the example shown, the rotor shaft 2 with the receiving element 5 is rotated to the right in the direction of the arrow 14. Because of the symmetry of the contours 10 and 11, the clamping of the clamping bodies 7, 8, 9 and the transmission of a torque from the rotor shaft 2 to the rotor cup 3 functions in the same manner when the rotor shaft 2 is rotated to the left.

As can be seen in FIG. 1, the coupling device also has a holding magnet 13. The holding magnet 13 acts on the axle element, which consists of a ferromagnetic material. The holding magnet 13 therefore ensures an axial locking of the rotor cup 2.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. Open-end spinning rotor (1), comprising a rotor shaft (2), a rotor cup (3) and a coupling device (4), which releasably connects the rotor shaft (2) and the rotor cup (3) and has a receiving element (5) connected to the rotor shaft (2) and an axle element (6) connected to the rotor cup (3), characterised in that the coupling device (4) comprises at least three clamping bodies (7, 8, 9), which are arranged between a contour (10) of the receiving element (5) and a contour (11) of the axle element (6), in that the contour (10) of the receiving element (5), the contour (11) of the axle element (6) and the clamping bodies (7, 8, 9) are configured in such a way that by driving the rotor shaft (2), a relative rotational movement is firstly produced between the receiving element (5) on the one hand and the clamping bodies (7, 8, 9) and the axle element (6) on the other hand, in that owing to the relative rotational movement, the clamping bodies (7, 8, 9) are clamped between the contour (11) of the axle element (6) and the contour (10) of the receiving element (5) and in that the drive torque is thereby transmitted from the rotor shaft (2) to the rotor cup (3), characterised further in that the contour (10) of the receiving element (5), the contour (11) of the axle element (6) and the clamping bodies (7, 8, 9) are configured in such a way that the clamping bodies (7, 8, 9), independently of the drive direction of the rotor shaft (2) when the rotor shaft (2) is driven, are clamped between the contour (10) of the receiving element (5) and the contour (11) of the axle element (6).

2. Open-end spinning rotor (1) according to claim 1, characterised in that the coupling device (4) has precisely three clamping bodies (7, 8, 9).

3. Open-end spinning rotor (1) according to claim 2, characterised in that the contour (10) of the receiving element (10) is triangle-like.

4. Open-end spinning rotor (1) according to claim 1, characterised in that the contour (11) of the axle element (6) is circular.

5. Open-end spinning rotor (1) according to claim 1, characterised in that the clamping bodies (7, 8, 9) are configured as rolling bodies.

6. Open-end spinning rotor (1) according to claim 1, characterised in that a cage (12) is associated with the receiving element (5), said cage being configured to hold the clamping bodies (7, 8, 9) in the receiving element (5) when the rotor cup (3) is released from the coupling device (4).

7. Open-end spinning rotor (1) according to claim 1, characterised in that the coupling device (4) has locking means (13) to axially lock the rotor cup (3).

* * * * *